United States Patent
Idemitsu et al.

(10) Patent No.: US 10,479,877 B2
(45) Date of Patent: Nov. 19, 2019

(54) FILLER COMPOSITION AND POLYOLEFIN RESIN COMPOSITION

(71) Applicant: UBE MATERIAL INDUSTRIES, LTD., Ube-shi, Yamaguchi (JP)

(72) Inventors: Takashi Idemitsu, Tokyo (JP); Shotaro Hida, Tokyo (JP); Tetsuo Takayama, Yonezawa (JP); Ryoichi Nomura, Ube (JP)

(73) Assignee: UBE MATERIAL INDUSTRIES, LTD., Yamaguchi (JP)

( * ) Notice: Subject to any disclaimer, the term of this patent is extended or adjusted under 35 U.S.C. 154(b) by 41 days.

(21) Appl. No.: 15/559,754

(22) PCT Filed: Mar. 29, 2016

(86) PCT No.: PCT/JP2016/060109
§ 371 (c)(1),
(2) Date: Sep. 19, 2017

(87) PCT Pub. No.: WO2016/158943
PCT Pub. Date: Oct. 6, 2016

(65) Prior Publication Data
US 2018/0044500 A1 Feb. 15, 2018

(30) Foreign Application Priority Data
Mar. 30, 2015 (JP) ................................. 2015-067908

(51) Int. Cl.
*C08K 3/30* (2006.01)
*C08K 3/36* (2006.01)
*C08K 7/08* (2006.01)
*C08K 9/06* (2006.01)

(52) U.S. Cl.
CPC .................. *C08K 3/30* (2013.01); *C08K 3/36* (2013.01); *C08K 7/08* (2013.01); *C08K 9/06* (2013.01); *C08K 2003/3063* (2013.01)

(58) Field of Classification Search
CPC ... C08K 3/30; C08K 3/36; C08K 7/04; C08K 7/08; C08K 7/18; C08K 9/06; C08K 2003/3063
See application file for complete search history.

(56) References Cited

FOREIGN PATENT DOCUMENTS

JP          2009-035713      *  2/2009

OTHER PUBLICATIONS

JP 9-156986 machine translation original date (1997).*
Machine translation of JP 2009-035713 (Year: 2009).*
Machine translation of JP 2009-138113 (Year: 2009).*
Machine translation of JP 2010-196012 (Year: 2010).*
Machine translation of JP 9-156986 (Year: 1997).*

* cited by examiner

*Primary Examiner* — Edward J Cain
(74) *Attorney, Agent, or Firm* — Nixon Peabody LLP; Jeffrey L. Costellia

(57) ABSTRACT

A filler composition comprising fibrous basic magnesium sulfate particles and non-fibrous inorganic micro-particles having an average particle diameter in the range of 0.001 to 0.5 μm in a ratio by weight in the range of 100:0.001 to 100:50, and a polyolefin resin composition comprising a polyolefin resin, fibrous basic magnesium sulfate particles and non-fibrous inorganic micro-particles having an average particle diameter in the range of 0.001 to 0.5 μm, in which the polyolefin resin and fibrous basic magnesium sulfate particles are present in a weight ratio of 99:1 to 50:50, and the non-fibrous inorganic micro-particles are present in an amount of 0.001 to 50 weight parts per 100 weight parts of the basic fibrous magnesium sulfate particles and/or in an amount of 0.0002 to 10 weight parts, per 100 weight parts of the resin.

7 Claims, No Drawings

FILLER COMPOSITION AND POLYOLEFIN RESIN COMPOSITION

FIELD OF THE INVENTION

This invention relates to a filler composition, and further relates to a polyolefin resin composition containing the filler composition.

BACKGROUND OF THE INVENTION

Polyolefin resins such as a polypropylene resin are widely used for manufacturing exterior and interior parts of automobiles, exterior parts of household electric apparatuses such as electric refrigerators and electric washing machines, and a variety of molded products such as trays, shelf boards and wrapping sheets.

The polyolefin resins are generally utilized in the form of polyolefin resin compositions containing fillers so as to improve such physical properties as rigidity and impact resistance. The fillers generally employed for these purposes are fibrous inorganic fillers or non-fibrous inorganic fillers.

Patent Publication 1 (JP 2009-167407A) discloses a polypropylene resin composition that can be molded with less mold-staining and less troubles so as to give a molded product showing high antistatic properties as well as high light-resistance with good moldability. The molded product shows good balance between rigidity and impact resistance, and has good appearance with less flow marks. The disclosed polypropylene resin composition comprises 99 to 60 weight parts of a polymer of polypropylene group, 1 to 40 weight parts of an inorganic filler (or inorganic filler material) having an average particle diameter of 0.01 to 100 µm, and 0.05 to 5 weight parts of a specific light stabilizer of the hindered amine type. In this publication, there are described non-fibrous inorganic fillers, fibrous inorganic fillers and their mixtures as inorganic fillers.

Patent Publication 2 (JP 2015-13978A) discloses a filler composition that can be incorporated into thermoplastic resins and thermosetting resins in which the filler composition comprises an inorganic fiber and spherical silica particles having a volume-average particle diameter of 0.01 to 5 µm. This publication has such description that resin compositions containing this filler composition shows good fluidity and further describes examples of the inorganic fibers such as carbonaceous fibers, fibers comprising carbonaceous materials as main components, glass and combinations of glass and other materials.

Patent Publication 3 (JP 2011-213514A) describes fine silica particles having surfaces treated with a silane-coupling agent and an organo-silazane and indicates that these fine silica particles show good affinity to resins and are kept from aggregation.

Recently, it is desired that automobiles have increased light-weight bodies for decreasing fuel consumption. For instance, exterior parts of automobiles such as bumpers are studied to reduce their thicknesses for decreasing their weights. However, the bumpers of automobiles are required, even in the case that their thicknesses are reduced, to still have high impact-resistance and high rigidity for keeping the bumpers from breakage when the bumpers are brought into contact with other automobiles or other solid materials, and further for keeping from deformation under pressures given by forces applied from the outside. However, since the molded product of the polypropylene resin that is widely used for manufacturing bumpers of automobiles shows a relationship of trade-off between its impact resistance and its rigidity. Therefore, it is known that if one of these properties increases, another property likely decreases.

The inventors of the present invention studied fillers described in each of the Patent Publications 1, 2 and 3 for the use as fillers for polyolefin resins.

As a result of the studies, the inventors have found that molded products having a thin thickness such as bumpers of automobiles manufactured using polyolefin resin containing fillers described in these patent publications hardly show such high impact resistance as required for the bumpers of automobiles, without decrease of rigidity.

Based on the above-described finding, the present inventors have studied to find a polyolefin resin composition such as a polypropylene resin composition that is employable for manufacturing a molded product showing both of high rigidity and high impact resistance.

SUMMARY OF THE INVENTION

It has been now found by the inventors that a polyolefin resin composition comprising a polyolefin resin, fibrous basic magnesium sulfate particles and non-fibrous inorganic micro-particles having an average particle diameter in the range of 0.001 to 0.5 µm in which the polyolefin resin and fibrous basic magnesium sulfate particles are contained in a ratio by weight in the range of 99:1 to 50:50, and the non-fibrous inorganic micro-particles are contained in an amount of 0.001 to 50 weight parts per 100 weight parts of the fibrous basic magnesium sulfate particles and/or in an amount of 0.0002 to 10 weight parts per 100 weight parts of the resin is employable for manufacturing molded products which show prominently high Izod impact strength without essentially decreasing flexural modulus. Izod impact strength is regarded as indication of impact resistance, and the flexural modulus is regarded as indication of rigidity.

Accordingly, the invention provides a polyolefin resin composition comprising a polyolefin resin, fibrous basic magnesium sulfate particles and non-fibrous inorganic micro-particles having an average particle diameter in the range of 0.001 to 0.5 µm in which the polyolefin resin and fibrous basic magnesium sulfate particles are contained in a ratio by weight in the range of 99:1 to 50:50, and the non-fibrous inorganic micro-particles are contained in an amount of 0.001 to 50 weight parts per 100 weight parts of the fibrous basic magnesium sulfate particles and/or in an amount of 0.0002 to 10 weight parts per 100 weight parts of the resin.

The invention further provides a filler composition comprising fibrous basic magnesium sulfate particles and non-fibrous inorganic micro-particles having an average particle diameter in the range of 0.001 to 0.5 µm in a ratio by weight in the range of 100:0.001 to 100:50.

Preferred embodiments of the polyolefin resin compositions of the invention are described below.

(1) The non-fibrous inorganic micro-particles are spherical silicon dioxide particles.

(2) The fibrous basic magnesium sulfate particles have an average longer diameter in the range of 5 to 50 µm and an average shorter diameter in the range 0.1 to 2.0 µm, and an aspect ratio in terms of the average longer diameter/average shorter diameter is in the range of 5 to 50.

(3) The average diameter of the non-fibrous inorganic micro-particles is in the range of 1/5 to 1/500 per an average shorter diameter of the fibrous basic magnesium sulfate particles.

(4) The non-fibrous inorganic micro-particles are contained in an amount of 0.005 to 2 weight parts, per 100 weight parts of the fibrous basic magnesium sulfate particles.

(5) The non-fibrous inorganic micro-particles have surfaces treated with a coupling agent.

(6) The polyolefin resin is a polypropylene resin.

Preferred embodiments of the filler compositions of the invention are described below.

(1) The non-fibrous inorganic micro-particles are spherical silicon dioxide particles.

(2) The spherical silicon dioxide particles have an average particle diameter in the range of 0.005 to 0.1 μm.

(3) The fibrous basic magnesium sulfate particles have an average longer diameter and an average shorter diameter in the range of 5 to 50 μm and 0.1 to 2.0 μm, respectively, and an aspect ratio in terms of the average longer diameter/average shorter diameter is in the range of 5 to 50.

(4) The average diameter of the non-fibrous inorganic micro-particles is in the range of 1/5 to 1/500 per an average shorter diameter of the fibrous basic magnesium sulfate particles.

(5) The non-fibrous inorganic micro-particles are contained in an amount of 0.001 to 8 weight parts, per 100 weight parts of the fibrous basic magnesium sulfate particles.

(6) The non-fibrous inorganic micro-particles are contained in an amount of 0.005 to 2 weight parts, per 100 weight parts of the fibrous basic magnesium sulfate particles.

(7) The surface is treated with a coupling agent.

Effects of the Invention

Molded products of a resin composition, particularly a polyolefin resin composition, containing the filler composition of the invention have both of high impact strength and high rigidity. Accordingly, these molded products are favorably employable as exterior members of automobiles such as bumpers. Further, molded products of a resin composition, particularly a polyolefin resin composition, containing the filler composition of the invention are also favorably employable as interior members of automobiles such as instrument panels.

EMBODIMENTS OF THE INVENTION

The filler composition and polyolefin resin composition according to the invention are described below in detail.

The filler composition of the invention comprises a fibrous basic magnesium sulfate particles and non-fibrous inorganic micro-particles having an average particle diameter in the range of 0.001 to 0.5 μm. The non-fibrous inorganic micro-particles are preferably dispersed and attached onto surfaces of the fibrous basic magnesium sulfate particles. The non-fibrous inorganic micro-particles are contained in an amount of 0.001 to 50 weight parts, preferably 0.001 to 20 weight parts, more preferably 0.001 to 8 weight parts, most preferably 0.005 to 2 weight parts, per 100 weight parts of the fibrous basic magnesium sulfate particles.

The fibrous basic magnesium sulfate particles generally have an average longer diameter in the range of 5 to 50 μm, preferably 10 to 30 μm, and generally have an average shorter diameter in the range of 0.1 to 2.0 μm, preferably 0.5 to 1.0 μm. An average aspect ratio (average longer diameter/average shorter diameter) generally is 2 or more, preferably 5 or more, more preferably in the range of 5 to 50. The average longer diameter and average shorter diameter of the fibrous basic magnesium sulfate particles are values determined and averaged on 1,000 particles seen in an enlarged image obtained by means of a scanning electro-microscope (SEM).

The non-fibrous inorganic micro-particles employed in the invention have an average particle diameter (average diameter of primary particles) in the range of 0.001 to 0.5 μm (1 nm to 500 nm), preferably 0.002 to 0.2 μm (2 nm to 200 nm), more preferably 0.005 to 0.1 μm (5 nm to 100 nm). The average particle diameter of the non-fibrous inorganic micro-particles is generally in the range of 1/2 to 1/1,000, preferably 1/2 to 1/500, more preferably 1/5 to 1/500, per an average shorter diameter of the fibrous basic magnesium sulfate particles. The average particle diameter of the non-fibrous inorganic micro-particles can be determined by image analysis of SEM image or by means of a particle size distribution analyzer.

Examples of the non-fibrous inorganic micro-particles include silicon dioxide particles, magnesium oxide particles, magnesium hydroxide particles, basic magnesium carbonate particles and calcium carbonate particles. The non-fibrous inorganic micro-particles preferably are in the form of spherical particles. The spherical particles are particles having an average aspect ratio (average longer diameter/average shorter diameter) of less than 2, preferably less than 1.5. The non-fibrous inorganic micro-particles preferably are spherical silicon dioxide particles.

The filler composition of the invention can be prepared, for example, by mixing the fibrous basic magnesium sulfate particles and the non-fibrous inorganic micro-particles. The mixing can be performed by dry mixing by the use of a dry mixer or by wet mixing by the use of a wet mixer using a liquid dispersing medium. The wet mixing is preferred to uniformly mix the fibrous basic magnesium sulfate particles with the non-fibrous inorganic micro-particles.

The dry mixer for performing the dry mixing can be high speed-rotation mills (e.g., cutter mill, cage mill, hammer mill, pin mill, turbo mill, and centrifugal classification mill) and a jet mill.

The dispersing medium for the use in a wet mixer can be water, lower alcohols and ketones. The wet mixing can be performed by mixing a dispersion of the fibrous basic magnesium sulfate particles with a dispersion of the non-fibrous inorganic micro-particles; a dispersion of the fibrous basic magnesium sulfate particles with powdery non-fibrous inorganic micro-particles; powdery fibrous basic magnesium sulfate particles with a dispersion of the non-fibrous inorganic micro-particles; and powdery fibrous basic magnesium sulfate particles, powdery non-fibrous inorganic micro-particles and a liquid medium. The wet mixer can be a stirrer or a medium stirring mill. Further, rotating dispersers such as a ultrasonic disperser and a homomixer, a high pressure homomixer, and a wet jet mill.

The filler composition of the invention can be surface-treated with a coupling agent for increasing affinity to resins. Examples of the coupling agents include silane coupling agents (i.e., alkoxysilanes having functional groups selected from those consisting of phenyl, vinyl, epoxy, methacryl, amino, ureido, mercapto, isocyanate and acryl). The surface treatment with the coupling agent can be applied either of the fibrous basic magnesium sulfate particles or the non-fibrous inorganic micro-particles.

The filler composition of the invention can be incorporated into other thermoplastic resins than the polyolefin resin and thermosetting resins. Examples of the thermoplastic resins include polyolefin resins, polyester resins, polyamide resins and polyacryl resins. Examples of the polyolefin resins include an ethylene homopolymer, a propylene homopolymer, a copolymer of ethylene and propylene, copolymers of ethylene and α-olefins, and copolymers of propylene and α-olefins. Examples of the polyester resins include polyethylene terephthalate and polybutylene terephthalate. Examples of the polyamide resins include 6-nylon and 6,6-nylon. Examples of the polyacryl resins include poly(methyl methacrylate). In addition, the filler composition can be incorporated into polycarbonate and polyether imide. Examples of the thermosetting resins include epoxy resins, phenol resins and urethane resins.

The filler composition of the invention provides specifically noticeable physical characteristic-improving effects, particularly when it is incorporated into polyolefin resins such as a polypropylene resin and a polyethylene resin.

The filler composition of the invention can be incorporated into resins in a weight ratio (in terms of resin:filler) in the range of 99:1 to 50:50, preferably 99:1 to 70:30. The filler composition of the invention can be incorporated into a resin by means of kneaders such as a uniaxial melt-kneading extruder, a double screw melt-kneading extruder or a bambury mixer.

The resin can contain additives such as oxidation inhibitors, UV absorbers, pigments, antistatic agents, rust inhibitors, flame retardants, lubricants, neutralizing agents, foaming agents, plasticizing agents, anti-foaming agent, and cross-linkers, in addition to the filler composition of the invention. These additives are known to improve the physical characteristics of the resin compositions.

The resin composition containing the filler composition of the invention can be molded by known molding methods. Examples of the known molding methods include injection molding, extrusion, calendaring, blow molding, expansion molding, and drafting.

EXAMPLES

Comparison Example 1

85 Weight parts of polypropylene resin [MFR (temperature 230° C., load 2.16 kg): 52 g/min.) and 15 weight parts of fibrous basic magnesium sulfate particles (MOS A-1, available from Ube Material Industries, Limited, average longer diameter: 15 μm, average shorter diameter: 0.5 μm) were mixed. The resulting mixture was melt-kneaded and extruded at a temperature of 230° C., rotation of screws: 250 r.p.m.) by means of a double screw melt-kneading extruder (Laboplast Mill Micro, L/D=18, available from Toyo Seiki Seisakusho Co., Ltd.) to give a melt-kneaded product in the form of a strand. The strand was cut to give pellets of a polypropylene resin composition containing the fibrous basic magnesium sulfate particles.

The resulting pellets of polypropylene resin composition was introduced into a small-sized injection molding machine (TE 3-1E, available from Nissei Jushi Industries, Ltd.) to produce specimens in the form of a small dumbbell (Type 1BB described in JIS-K-7162).

The specimens were subjected to measurements of Izod impact strength and flexural modulus. The Izod impact strength was 3.7 kJ/m$^2$ and the flexural modulus was 3.5 GPa.

The Izod impact strength was measured according to JIS-K-7110, by means of Notching machine (available from Imoto Seisakusho Co., Ltd.).

The flexural modulus was measured by means of a universal dynamic tester (Strograph VGF, available from Toyo Seiki Seisakusho Co., Ltd.).

Example 1

100 Weight parts of the fibrous basic magnesium sulfate particles employed in Comparison Example 1 were mixed with 0.15 weight part of spherical silica particles (Adomanano, available from Adomatex Co., Ltd., average particle diameter: 10 nm, determined from SEM image), by means of a dry mixer, to produce a filler composition.

The procedures of Comparison Example 1 were repeated except that 15 weight parts of the resulting filler composition were incorporated into 85 weight parts of the polypropylene resin, to produce pellets of polypropylene resin composition. The pellets were then subjected to the measurements of Izod impact strength and flexural modulus. It was confirmed that the resulting flexural modulus was essentially the same as that measured in Comparison Example 1. However, the Izod impact strength was apparently higher than that measured in Comparison Example 1.

Comparison Example 2

85 Weight parts of polypropylene resin [MFR (temperature 230° C., load 2.16 kg): 52 g/min.) and 15 weight parts of fibrous basic magnesium sulfate particles employed in Comparison Example 1 were mixed.

The resulting mixture was melt-kneaded and extruded at a temperature of 230° C., rotation of screws: 90 r.p.m.) by means of a double screw melt-kneading extruder (L/D=25, available from Imoto Seisakusho Co., Ltd.), to give a melt-kneaded product in the form of a strand. The strand was cut to give pellets of a polypropylene resin composition containing the fibrous basic magnesium sulfate particles.

The resulting pellets of polypropylene resin composition was introduced into a small-sized injection molding machine (manually operable injection molding machine, Handy Try, available from Shinko Cellbit) and injected at cylinder temperature of 230° C. and mold temperature of 50° C., to produce specimens in the form of strip (width 5 mm, thickness 2 mm, length 50 mm).

The specimens were subjected to measurements of Izod impact strength and flexural modulus. The results of the measurements are set forth in Table 1.

The Izod impact strength was measured by means of an Izod impact tester (available from Maise Tester Co., Ltd.) according to the measuring method described in JIS-K-7110.

The flexural modulus was measured by means of an electric measuring stand (MX-500N, available from Imada Co., Ltd.) and a digital force gauge (ZTA-500N, available from Imada Co., Ltd.) under the conditions of a load rate of 10 mm/min. and a distance between the support points of 40 mm.

Example 2

100 Weight parts of the fibrous basic magnesium sulfate particles were mixed with 0.015 weight part of spherical silica particles (both employed in Comparison Example 1) by means of a dry mixer, to produce a filler composition.

The procedures of Comparison Example 2 were repeated except that 15 weight parts of the resulting filler composition were incorporated into 85 weight parts of the polypropylene resin, to produce pellets. The pellets were then converted into specimens in the manner described in Comparison Example 2 and subjected to the measurements of Izod impact strength and flexural modulus. The results of the measurements are set forth in Table 1.

Example 3

The procedures of Example 2 were repeated except that the spherical silica particles were mixed in an amount of 0.15 weight part, to produce a filler composition.

The filler composition was incorporated into the polypropylene resin in the same manner to produce pellets. The pellets were then converted into specimens in the same manner and subjected to the measurements of Izod impact strength and flexural modulus. The results of the measurements are set forth in Table 1.

Example 4

The procedures of Example 2 were repeated except that the spherical silica particles were mixed in an amount of 1.5 weight parts, to produce a filler composition.

The filler composition was incorporated into the polypropylene resin in the same manner to produce pellets. The pellets were then converted into specimens in the same manner and subjected to the measurements of Izod impact strength and flexural modulus. The results of the measurements are set forth in Table 1.

TABLE 1

|  | C/B | Izod impact strength (kJ/m$^2$) | flexural modulus (GPa) |
| --- | --- | --- | --- |
| Com. Ex. 2 | 0 | 2.1 | 2.8 |
| Example 2 | 0.00015 | 2.4 | 3.0 |
| Example 3 | 0.0015 | 2.7 | 3.1 |
| Example 4 | 0.015 | 3.0 | 3.1 |

Remark: C/B means a ratio of the amount by weight of spherical silica particles (C) per 100 weight parts of the fibrous basic magnesium sulfate particles (B).

Example 5

85 Weight parts of polypropylene resin [MFR (temperature 230° C., load 2.16 kg): 52 g/min.), 15 weight parts of fibrous basic magnesium sulfate particles (MOS A-1, available from Ube Material Industries, Limited, average longer diameter: 15 μm, average shorter diameter: 0.5 μm) and 0.0015 weight part of spherical silica particles (Adomanano, available from Adomatex Co., Ltd., average particle diameter: 10 nm, determined from SEM image, by means of a dry mixer. The resulting mixture was melt-kneaded and extruded at a temperature of 230° C., rotation of screws: 250 r.p.m.) by means of a double screw melt-kneading extruder (Laboplast Mill Micro, L/D=18, available from Toyo Seiki Seisakusho Co., Ltd.) to give a melt-kneaded product in the form of a strand. The strand was cut to give pellets of the polypropylene resin composition containing the fibrous basic magnesium sulfate particles and spherical silica particles.

Example 6

The procedures of Example 5 were repeated except for using the spherical silica particles in an amount of 0.015 weight part, to give pellets of the polypropylene resin composition.

Example 7

The procedures of Example 5 were repeated except for using the spherical silica particles in an amount of 0.15 weight part, to give pellets of the polypropylene resin composition.

Example 8

The procedures of Example 5 were repeated except for using the spherical silica particles in an amount of 0.75 weight part, to give pellets of the polypropylene resin composition.

Example 9

The procedures of Example 5 were repeated except for using the spherical silica particles in an amount of 1.0 weight part, to give pellets of the polypropylene resin composition.

Example 10

The procedures of Example 5 were repeated except for using the spherical silica particles in an amount of 1.5 weight parts, to give pellets of the polypropylene resin composition.

Example 11

The procedures of Example 5 were repeated except for using the spherical silica particles in an amount of 4.5 weight parts, to give pellets of the polypropylene resin composition.

Example 12

The procedures of Example 5 were repeated except for using the spherical silica particles in an amount of 7.5 weight parts, to give pellets of the polypropylene resin composition.

Comparison Example 3

The procedures of Example 5 were repeated except for using no spherical silica particles, to give pellets of the polypropylene resin composition.

The amounts in terms of weight part(s) of the polypropylene resin, fibrous basic magnesium sulfate particles and spherical silica particles, the ratio of the spherical silica particles per 100 weight parts of the polypropylene resin, and the ratio of the spherical silica particles per 100 weight parts of the fibrous basic magnesium sulfate particles employed in Examples 5 to 12 and Comparison Example 3 are set forth in Table 2 below.

TABLE 2

|  | A | B | C | C/A | C/B |
| --- | --- | --- | --- | --- | --- |
| Example 5 | 85 | 15 | 0.0015 | 0.0018 | 0.010 |
| Example 6 | 85 | 15 | 0.015 | 0.018 | 0.10 |
| Example 7 | 85 | 15 | 0.15 | 0.18 | 1.0 |
| Example 8 | 85 | 15 | 0.75 | 0.88 | 5.0 |
| Example 9 | 85 | 15 | 1.0 | 1.2 | 6.7 |
| Example 10 | 85 | 15 | 1.5 | 1.8 | 10 |
| Example 11 | 85 | 15 | 4.5 | 5.3 | 30 |

TABLE 2-continued

|  | A | B | C | C/A | C/B |
|---|---|---|---|---|---|
| Example 12 | 85 | 15 | 7.5 | 8.8 | 50 |
| Com. Ex. 3 | 85 | 15 | 0 | 0 | 0 |

Remarks:
A: Amount of polypropylene resin (weight parts)
B: Amount of fibrous basic magnesium sulfate particles (weight parts)
C: Amount of spherical silica particles (weight part(s))
C/A: Amount (weight part(s)) of spherical silica particles per 100 weight parts of polypropylene resin
C/B: Amount (weight part(s)) of spherical silica particles per 100 weight parts of fibrous basic magnesium sulfate particles

[Evaluations]

The pellets of polypropylene resin compositions produced in Examples 5 to 12 and Comparison Example 3 were converted into specimens in the form of small-sized dumbbell described in JIS-K-7162, by means of a small size injection molding machine (TE 3-1E, available from Nissei Resin Industries, Co., Ltd.).

The specimens were subjected to the measurements of Izod impact strength and flexural modulus. The results of the measurements together with C/A and C/B noted in Table 2 are set forth in Table 3.

TABLE 3

|  | C/A | C/B | Izod impact strength (kJ/m$^2$) | flexural modulus (GPa) |
|---|---|---|---|---|
| Example 5 | 0.0018 | 0.010 | 5.5 | 3.9 |
| Example 6 | 0.018 | 0.10 | 6.5 | 3.5 |
| Example 7 | 0.18 | 1.0 | 6.3 | 3.7 |
| Example 8 | 0.88 | 5.0 | 5.2 | 3.6 |
| Example 9 | 1.2 | 6.7 | 5.3 | 4.0 |
| Example 10 | 1.8 | 10 | 4.8 | 3.7 |
| Example 11 | 5.3 | 30 | 4.2 | 3.7 |
| Example 12 | 8.8 | 50 | 3.9 | 3.7 |
| Com. Ex. 3 | 0 | 0 | 3.7 | 3.5 |

Remarks:
C/A: Amount (weight part(s)) of spherical silica particles per 100 weight parts of polypropylene resin
C/B: Amount (weight part(s)) of spherical silica particles per 100 weight parts of fibrous basic magnesium sulfate particles The results of measurements set forth in Tables 1 to 3 indicate that molded products made from polypropylene resin compositions of the invention (which are shown in Examples 1 to 12) which comprises a polypropylene resin, fibrous basic magnesium sulfate particles and non-fibrous inorganic micro-particles such as spherical silica particles show enhanced Izod impact strength as compared with molded products made from the polypropylene resin compositions containing only a polypropylene resin and fibrous basic magnesium sulfate particles (which are shown in Com. Examples 1 to 3), keeping or slightly increasing the flexural modulus.

What is claimed is:

1. A polyolefin resin composition comprising a polyolefin resin, fibrous basic magnesium sulfate particles and spherical silicon dioxide particles having an average particle diameter in the range of 0.001 to 0.5 μm in which the polyolefin resin and fibrous basic magnesium sulfate particles are contained in a ratio by weight in the range of 99:1 to 50:50, and the spherical silicon dioxide particles are contained in an amount of 0.001 to 50 weight parts per 100 weight parts of the fibrous basic magnesium sulfate particles and/or in an amount of 0.0002 to 10 weight parts per 100 weight parts of the resin.

2. The polyolefin resin composition of claim 1, wherein the fibrous basic magnesium sulfate particles have an average longer diameter in the range of 5 to 50 μm and an average shorter diameter in the range of 0.1 to 2.0 μm, and an aspect ratio in terms of the average longer diameter/average shorter diameter is in the range of 5 to 50.

3. The polyolefin resin composition of claim 1, wherein the average diameter of the spherical silicon dioxide particles is in the range of 1/5 to 1/500 per an average shorter diameter of the fibrous basic magnesium sulfate particles.

4. The polyolefin resin composition of claim 1, wherein the spherical silicon dioxide particles are contained in an amount of 0.005 to 2 weight parts, per 100 weight parts of the fibrous basic magnesium sulfate particles.

5. The polyolefin resin composition comprising a polyolefin resin, fibrous basic magnesium sulfate particles and non-fibrous inorganic micro-particles having an average particle diameter in the range of 0.001 to 0.5 μm in which the polyolefin resin and fibrous basic magnesium sulfate particles are contained in a ratio by weight in the range of 99:1 to 50:50, and the non-fibrous inorganic micro-particles are contained in an amount of 0.001 to 50 weight parts per 100 weight parts of the fibrous basic magnesium sulfate particles and/or in an amount of 0.0002 to 10 weight parts per 100 weight parts of the resin, wherein the non-fibrous inorganic micro-particles have surfaces treated with a coupling agent.

6. The polyolefin resin composition of claim 5, wherein the polyolefin resin is a polypropylene resin.

7. The polyolefin resin composition of claim 1, wherein the polyolefin resin is a polypropylene resin.

* * * * *